(12) United States Patent
Cho et al.

(10) Patent No.: US 10,106,361 B2
(45) Date of Patent: Oct. 23, 2018

(54) SHEET MANUFACTURING METHOD AND MANUFACTURING APPARATUS

(71) Applicant: Corning Precision Materials Co., Ltd., Chungcheongnam-do (KR)

(72) Inventors: Dong Young Cho, Chungcheongnam-do (KR); Ki Nam Kim, Chungcheongnam-do (KR); Shin Kim, Chungcheongnam-do (KR); Mun Hwan Seol, Chungcheongnam-do (KR)

(73) Assignee: Corning Precision Materials Co., Ltd. (KR)

( * ) Notice: Subject to any disclaimer, the term of this patent is extended or adjusted under 35 U.S.C. 154(b) by 155 days.

(21) Appl. No.: 15/033,983

(22) PCT Filed: Oct. 30, 2014

(86) PCT No.: PCT/KR2014/010301
§ 371 (c)(1),
(2) Date: May 3, 2016

(87) PCT Pub. No.: WO2015/065065
PCT Pub. Date: May 7, 2015

(65) Prior Publication Data
US 2016/0272456 A1    Sep. 22, 2016

(30) Foreign Application Priority Data
Nov. 4, 2013 (KR) .......................... 10-2013-0133102

(51) Int. Cl.
*B65H 35/04* (2006.01)
*C03B 33/023* (2006.01)

(52) U.S. Cl.
CPC ......... *B65H 35/04* (2013.01); *C03B 33/0235* (2013.01); *B65H 2801/61* (2013.01)

(58) Field of Classification Search
CPC .. B65H 2801/61; B65H 35/04; B03B 33/0235
See application file for complete search history.

(56) References Cited

U.S. PATENT DOCUMENTS 6,455,982 B1 * 9/2002 Hashimoto .......... B65G 35/005
310/328
2009/0014283 A1 * 1/2009 Zimmermann ........ B65G 54/02
198/630

(Continued)

FOREIGN PATENT DOCUMENTS

JP    1999040645 A    2/1999
JP    2012187453 A    10/2012

(Continued)

OTHER PUBLICATIONS

International Search Report for Application No. PCT/KR2014/010301 dated Feb. 2, 2015.

*Primary Examiner* — Stephen Choi
(74) *Attorney, Agent, or Firm* — Lerner, David, Littenberg, Krumholz & Mentlik, LLP

(57) ABSTRACT

The present invention provides a sheet manufacturing method comprising: an unwinding step of supplying an object from a roll on which the object is wound; a feeding step of feeding the supplied object; and a cutting step of cutting the fed object, wherein the cutting comprises sheet-cutting in which the object is cut in the width direction of the object. Further, the present invention provides a sheet manufacturing apparatus comprising: an unwinding part for supplying an object from a roll on which the object is wound; a feeding part for feeding the supplied object; and a cutting part for the fed object, wherein the cutting comprises sheet-cutting in which the object is cut in the width direction of the object.

13 Claims, 3 Drawing Sheets

(56) References Cited

U.S. PATENT DOCUMENTS

| | | | | |
|---|---|---|---|---|
| 2011/0011704 A1* | 1/2011 | Isobe | ................... | B65G 37/00 |
| | | | | 198/752.1 |
| 2011/0198378 A1* | 8/2011 | Chang | .................. | B65G 49/063 |
| | | | | 226/7 |
| 2012/0247154 A1* | 10/2012 | Abramov | ............ | C03B 33/0235 |
| | | | | 65/54 |

FOREIGN PATENT DOCUMENTS

| KR | 20060100917 A | 9/2006 |
|---|---|---|
| KR | 20080062136 A | 7/2008 |
| KR | 20100057530 A | 5/2010 |

\* cited by examiner

SHEET MANUFACTURING METHOD AND MANUFACTURING APPARATUS

CROSS-REFERENCE TO RELATED APPLICATION

This application is a national phase entry under 35 U.S.C. § 371 of International Application No. PCT/KR2014/010301, filed Oct. 30, 2014, published in Korean, which claims priority to Korean Patent Application No. 10-2013-0133102, filed on Nov. 4, 2013, the disclosures of which are incorporated herein by reference.

BACKGROUND OF THE INVENTION

Field of the Invention

The present invention relates to a method and apparatus for manufacturing a sheet, and more particularly, to a method and apparatus for manufacturing a sheet by a roll-to-roll process.

Description of Related Art

As display devices become thinner and lighter, glass substrates are also becoming thinner. In addition, displays having a curved surface instead of a planar surface are now being fabricated, and studies on flexible displays are also actively underway. Therefore, glass substrates are required to be thinner and more flexible.

When transporting or processing an ultra-thin glass sheet (having a thickness of 0.5 mm or less) as in the related art, the flexibility of glass makes it difficult to input the glass sheet into a processing line or transport the glass sheet along or out of the processing line. In addition, since respective sheets must be loaded one by one, productivity is still not optimized. In order to overcome this limited productivity and facilitate transportation, an approach of manufacturing a thin glass sheet by unwinding and transporting a thin glass web from a roll was introduced. The thin glass web or the thin glass sheet produced from the thin glass web can be used in a variety of fields, such as displays, electronic materials (e.g. photovoltaic cells, touch sensors and wafers), construction, and home appliances.

A web of a metal foil or a resin film is transported typically in a contact manner in a roll-to-roll process. In these fields, contact transportation does not create the problem of degraded surface quality. However, in the field of thin glass substrates that requires high surface quality, contact transportation may create severe problems, such as surface scratches, surface contamination caused by particles/organic matters, or breakage.

A method of coating a thin glass web with a protective film or a coating agent may be used in order to protect the glass surface. However, additional supplies must be continuously paid, which is problematic. In addition, a non-contact transportation approach using air floating was introduced in order to fundamentally remove factors damaging the glass substrate. However, the use of air also leads to the problem of utility costs. In addition, uncontrollable turbulence puts the web in an unstable state while being transported, thereby causing a dimensional defect when the web is cut into sheets.

When a web of film is transported, it is possible to control the transportation of the film web based on the elongation of the film since the film has a large elongation. However, the glass web tends to break when the transportation of the glass web is controlled based on the elongation of the glass since the glass has a small elongation. Therefore, it is impossible to use existing transportation apparatuses to transport the glass web.

The information disclosed in the Background of the Invention section is provided only for better understanding of the background of the invention and should not be taken as an acknowledgment or any form of suggestion that this information forms a prior art that would already be known to a person skilled in the art.

BRIEF SUMMARY OF THE INVENTION

Various aspects of the present invention are intended to remove the possibility of an object to be defective by preventing the object from surface contact with an apparatus and to improve transportation quality for the object based on the reliable floating force of ultrasonic waves.

In an aspect of the present invention, provided is a method of manufacturing a sheet that includes the following operations of: supplying an object from a roll on which the object is wound; transporting the supplied object; and cutting the transported object. The operation of cutting the transported object includes a sheet cutting operation of cutting the object along a width of the object.

Also provided is an apparatus for manufacturing a sheet that includes: an unwinder supplying an object from a roll on which the object is wound; a transportation unit transporting the supplied object; and a cutting unit cutting the transported object. The cutting operation of the cutting unit includes a sheet cutting operation of cutting the object along a width of the object.

According to the present invention as set forth above, it is possible to remove the possibility of surface defects of an object by preventing the object from surface contact with the apparatus and to improve transportation quality for the object based on the reliable floating force of ultrasonic waves.

A sheet manufactured according to the present invention can retain high surface quality since its effective area does not have contact with the apparatus. Since the object is supplied in the shape of a web unwound from a roll, the operation of loading respective sheets can be excluded, thereby advantageously reducing processing time.

In particular, it is possible to wind a glass web on a roll right after the glass web is shaped by combining the method of manufacturing a sheet according to the present invention with a glass shaping process (e.g. a fusion draw process). Glass sheets can be subsequently manufactured from the glass web by the method according to the present invention, thereby reducing manufacturing costs. Since the glass web can be more easily treated and transported than a stack of glass substrates, the effect of reducing transportation costs can be obtained.

In addition, the non-contact vibration suppressing unit can be used at the trim cutting operation in order to prevent vibrations of trimmed portions from being transferred to an object. This can consequently prevent the object from being influenced by the vibrations, thereby improving edge quality. Furthermore, the non-contact vibration suppressing unit can be used at the sheet cutting operation in order to prevent disturbances from vibrating an object, thereby obtaining the dimensional accuracy of sheets.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Figure 1:
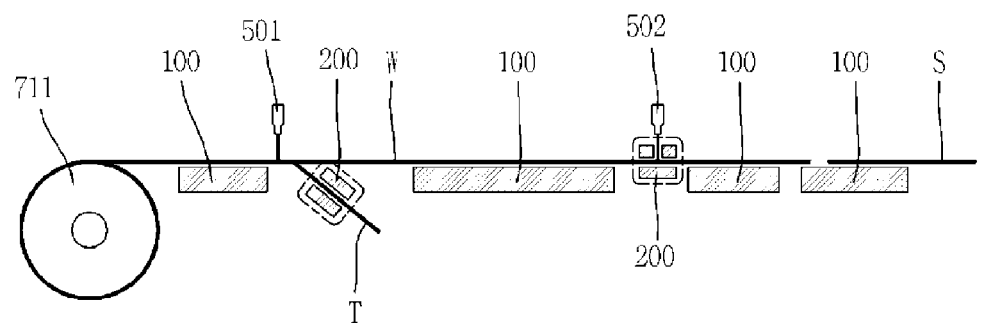
FIG. 1 schematically illustrates an apparatus for manufacturing a sheet according to an exemplary embodiment of the present invention.

Reference will now be made in detail to exemplary embodiments of the present invention in conjunction with the accompanying drawings, so that a person skilled in the art to which the present invention relates could easily put the present invention into practice.

Throughout this document, reference should be made to the drawings, in which the same reference numerals and signs are used throughout the different drawings to designate the same or similar parts. In the following description of the present invention, detailed descriptions of known functions and parts incorporated herein will be omitted in the case that the subject matter of the present invention is rendered unclear.

The present invention relates to a method of manufacturing a sheet. The sheet manufacturing method manufactures sheets S by cutting an object O (see FIG. 4) that is supplied in the shape of a web W unwound from a roll.

For this, the object O supplied in the shape of the web W is transported and processed, and the web W is transported in a non-contact manner using ultrasonic vibrations. The effective area of the object O is transported in a non-contact manner using an ultrasonic non-contact technology disclosed in Korean Patent Application Publication No. 10-2010-0057530. The object O is transported downstream of the apparatus for manufacturing a sheet in a non-contact manner, where a non-contact cutting unit 502 having a laser completely cuts the object O into sheets S, which are subsequently transported to the subsequent operation in a non-contact manner.

A non-contact vibration suppressing unit 200 is provided on a path along which the object O is transported in order to suppress vibrations of the object O. In particular, the non-contact vibration suppressing unit 200 is applied to a trim cutting operation and a sheet cutting operation in order to increase the precision of cutting.

Figure 4:
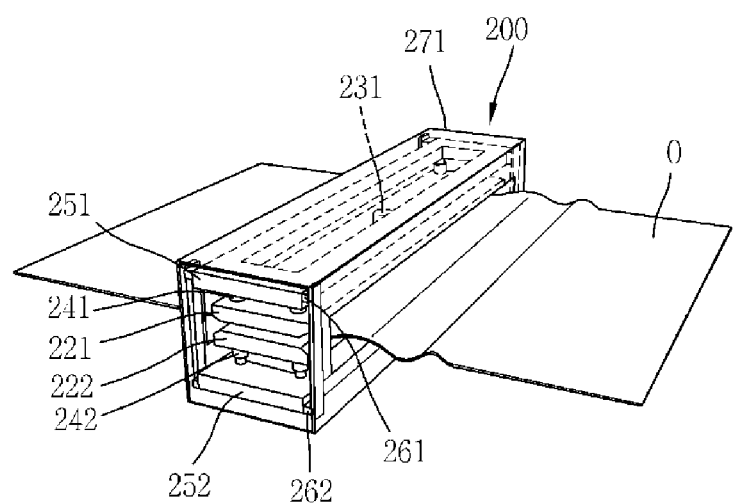
FIG. 4 and FIG. 5 schematically illustrate the vibration suppressing unit illustrated in FIG. 1.

As illustrated in FIG. 4, the non-contact vibration suppressing unit 200 includes a first ultrasonic vibrator 221 and a second ultrasonic vibrator 222. The first ultrasonic vibrator 221 and the second ultrasonic vibrator 222 are spaced apart from and face each other such that the object O can be transported therebetween. The first ultrasonic vibrator 221 and the second ultrasonic vibrator 222 hold the object O therebetween in a non-contact manner by generating ultrasonic vibrations and applying repelling force induced from the ultrasonic vibrations to the object O, thereby suppressing vibrations of the object O.

While the object O is typically thin glass, the present invention is not limited thereto and the object O can be formed of a variety of other materials.

Figure 2:
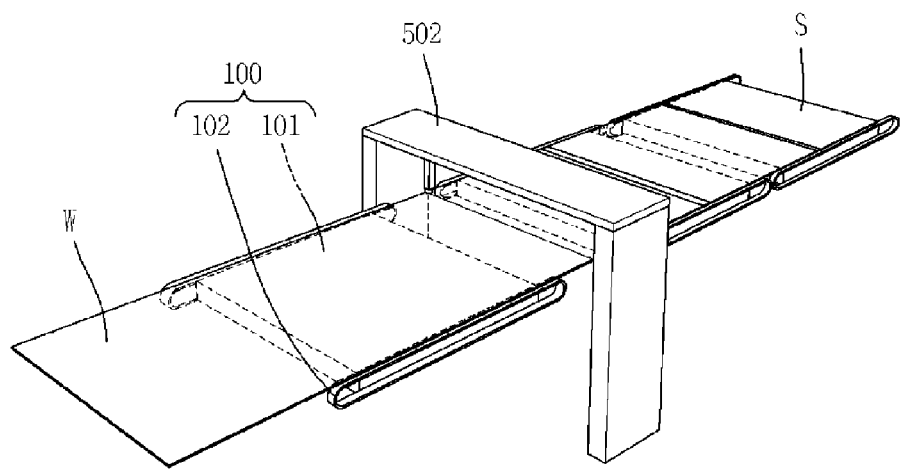
FIG. 2 is a partial perspective view of the apparatus for manufacturing a sheet illustrated in FIG. 1.

FIG. 1 schematically illustrates an apparatus for manufacturing a sheet according to an exemplary embodiment of the present invention, and FIG. 2 is a partial perspective view of the apparatus for manufacturing a sheet illustrated in FIG. 1.

The apparatus for manufacturing a sheet illustrated in FIG. 1 includes an unwinder 711, a transportation unit 100 and a cutting unit 500.

The unwinder 711 supplies the object O by unwinding the object O from the roll on which the object O is wound. In the case that the object O is coated with a protective film, the protective film is peeled off from the object O before the object O is input into the apparatus. The protective film is subsequently wound on a protective film reel.

The object O from which the protective film is removed is transported downstream by the transportation unit 100.

The cutting unit 500 cuts the object O that has been transported thereto. It is preferable that the cutting unit 500 cuts the object O in a non-contact manner. For example, the cutting unit 500 cuts the object O using a laser. The cutting unit 500 includes a trim cutting unit 501, as well as the sheet cutting unit 502. The sheet cutting unit 502 cuts the object O along the width of the object O. Before the web W is cut along the width, the trim cutting unit 501 can cut one or both edge portions of the web W along the length of the web W. The portions of the web W to be trimmed are thicker than the other portions of the web W. When the portions to be trimmed remains without being cut off, they may cause a problem to the web W during the sheet cutting operation. The trim cutting operation completely cuts the edge portions using a laser source, and the trimmed portions T are discharged in a different direction from the web W and are subsequently crushed.

The non-contact vibration suppressing unit 200 is disposed on a path along which the trimmed portions T separated from the object O (e.g. the web W) are discharged. Since vibrations occurring during the crushing of the trimmed portions T may have an adverse effect on the precision of the transportation of the web W when they are transferred backwards to the web W, the non-contact vibration suppressing unit 200 prevents the vibrations of the trimmed portions T from being transferred to the web W by suppressing the vibrations of the trimmed portions T. While the vibration suppressing unit 200 is a non-contact type having an ultrasonic vibrator, it can be implemented as a contact type having rollers that come into direct contact with both surfaces of the trimmed portions T.

The non-contact vibration suppressing unit 200 includes the first ultrasonic vibrator 221 and the second ultrasonic vibrator 222. The first and second ultrasonic vibrators 221 and 222 are spaced apart from and face each other such that the trimmed portions T can pass therebetween. The first and second ultrasonic vibrators 221 and 222 hold the trimmed portions T therebetween in a non-contact manner by generating ultrasonic vibrations and applying repelling force induced from the ultrasonic vibrations to the trimmed portions T, thereby suppressing vibrations of the trimmed portions T.

A cleaning unit and a loading unit may be provided downstream of the sheet cutting unit 502 as required. The sheet S may be coated with a protective film in order to protect the sheet S when the sheet S is loaded. A paper sheet may be stacked on the sheet S.

Figure 3:
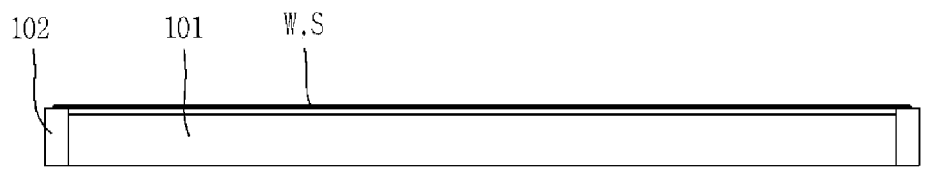
FIG. 3 schematically illustrates the transportation unit illustrated in FIG. 1.

FIG. 3 schematically illustrates the transportation unit 100 illustrated in FIG. 1.

The transportation unit 100 is a non-contact transportation unit, and includes an ultrasonic vibrator 101. The transportation unit 100 further includes a plurality of ultrasonic wave generators for vibrating the ultrasonic vibrator 101 and a frame fixing the ultrasonic vibrator 101. The ultrasonic vibrator 101 is disposed to face the object O. The ultrasonic vibrator 101 may have the shape of a vibration plate conforming to the object O. The ultrasonic vibrator 101 applies the repelling force of a high-pressure air layer induced from ultrasonic vibrations to the object O, thereby floating the object O in a non-contact manner.

The transportation unit 100 can further include a contact transportation unit 102. The contact transportation unit 102 transports the object O in contact with at least one part of the object O. As illustrated in the figures, the contact transportation unit 102 may come into contact with one or both surfaces of the object O. The contact transportation unit 102 is required to move at the same speed as the object O. The contact transportation unit 102 may include at least one selected from among, but not limited to, a conveyor belt, a roller and a clamp, each of which is to come into contact with the object O.

The ultrasonic vibrator 101 transports the object O in a non-contact manner by floating the object O by applying repelling force to the effective area of the object O. A contact transportation unit (such as a belt, a roller or a clamp) is configured to come into contact with the ineffective area of the object O, i.e. the portion having no effect on quality, thereby increasing the precision of the transportation of the object O. For example, the central area of a display substrate is used as a display area, and the peripheral area is used as a non-display area. The display area is the effective area, and the non-display area is the ineffective area.

The transportation unit 100 for transporting the object O includes a web transportation unit and a sheet transportation unit. The web transportation unit transports the web W of the object O before the web W is cut into sheets S. The sheet transportation unit transports the sheets S of the object O separated from the web of the object O by the sheet cutting operation.

Figure 5:
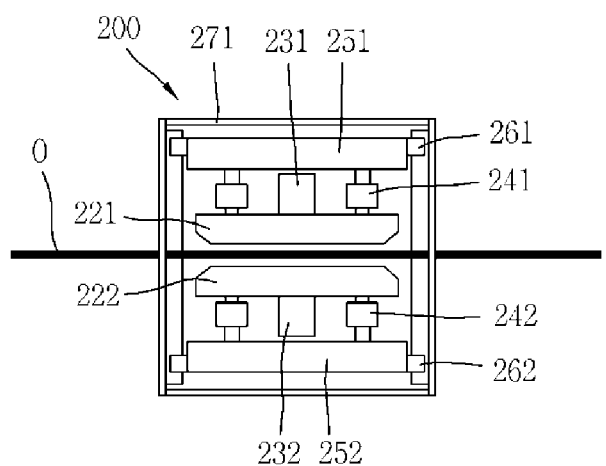

FIG. 4 and FIG. 5 schematically illustrate the vibration suppressing unit 200 illustrated in FIG. 1.

The non-contact vibration suppressing unit 200 includes the first ultrasonic vibrator 221 and the second ultrasonic vibrator 222. The first and second ultrasonic vibrators 221 and 222 are spaced apart from and face each other such that the web W (or the trimmed portions T) can be transported therebetween. The first and second ultrasonic vibrators 221 and 222 hold the web W (or the trimmed portions T) therebetween in a non-contact manner by generating ultrasonic vibrations and applying repelling force induced from the ultrasonic vibrations to the web W (or the trimmed portions T), thereby suppressing vibrations of the web W (or the trimmed portions T).

Ultrasonic generators 231 and 232 serve to cause the first and second ultrasonic vibrators 221 and 222 to generate ultrasonic vibrations. Vibration absorbers 241 and 242 prevent the vibrations of the ultrasonic vibrators 221 and 222 from being transferred to any other parts except for the object O. Fixing frames 251 and 252 are frames supporting the ultrasonic vibrators in fixed positions. A cover 271 accommodates parts of the vibration suppressing unit 200.

Height adjustment units 261 and 262 are configured to adjust the distance between the ultrasonic vibrators 221 and 222.

Figure 6:
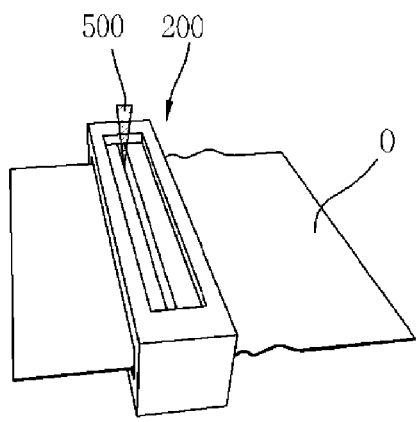
FIG. 6 and FIG. 7 schematically illustrate the sheet cutting unit and the vibration suppressing unit illustrated in FIG. 1.
Figure 7:
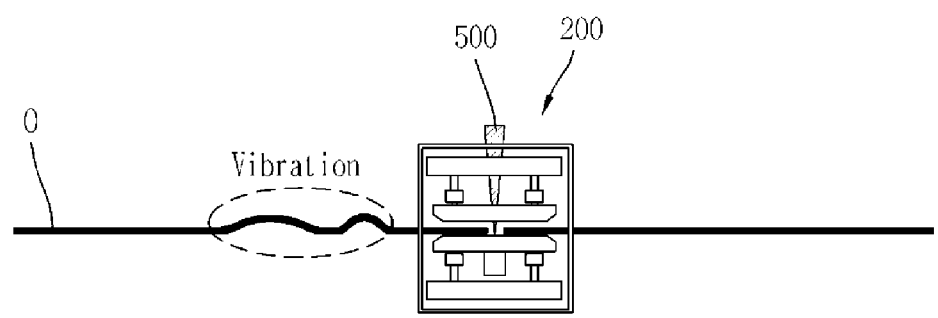

FIG. 6 and FIG. 7 schematically illustrate the sheet cutting unit 500 and the vibration suppressing unit 200 illustrated in FIG. 1.

The sheet cutting unit 502 completely cuts the glass web W along the width using a laser source. A laser beam is emitted through a slit of the vibration suppressing unit 200 to cut the glass web W, thereby completely preventing the vibration of the portion of the glass web W that is being cut. It is preferable that the transportation speed of the sheet S is greater than the transportation speed of the web W at least right after the sheet cutting operation. For example, right after the cutting operation, the transportation speed of the sheet S is accelerated to move the sheet S away from the web W, thereby preventing an edge defect that would otherwise occur when the sheet S has contact with the cut surface of the web W after the sheet cutting operation. In an apparatus configured to stop the transportation during the sheet cutting operation, the transportation of the web W can remain stopped for a predetermined time right after the sheet cutting operation. After the predetermined time, this apparatus can start the transportation of the sheet S before starting the transportation of the web W a little later.

The precision of the cutting operation is increased by holding the object O in a non-contact manner right after and/or before the cutting operation. The first ultrasonic vibrator 221 has a hole or a slit. The object O is cut by a laser beam irradiated onto the object O through the hole or slit.

Figure 8:
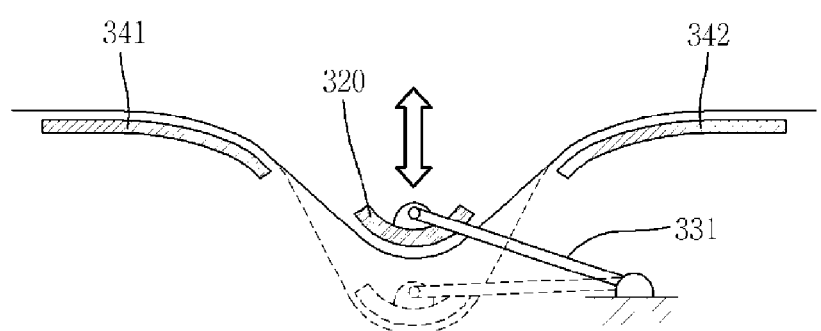
FIG. 8 schematically illustrates the tension adjustment unit.

FIG. 8 schematically illustrates the tension adjustment unit.

The tension adjustment unit includes a dancer 320, supports 341 and 342 and a link 331 that are disposed on a path along which the object O is transported. The dancer 320 adjusts the tension of the object O by applying force to the object O. The dancer 320 includes an ultrasonic vibrator. The ultrasonic vibrator generates ultrasonic vibrations and applies repelling force induced from the ultrasonic vibrations to the object O, thereby applying the force to the object O in a non-contact manner.

The foregoing descriptions of specific exemplary embodiments of the present invention have been presented with respect to the drawings. They are not intended to be exhaustive or to limit the present invention to the precise forms disclosed, and obviously many modifications and variations are possible for a person having ordinary skill in the art in light of the above teachings.

It is intended therefore that the scope of the present invention not be limited to the foregoing embodiments, but be defined by the Claims appended hereto and their equivalents.

What is claimed is:

1. A method of manufacturing a sheet comprising:
supplying an object from a roll on which the object is wound;
transporting the supplied object;
cutting the transported object comprising a sheet cutting operation of cutting the object along a width of the object; and
suppressing, using a non-contact vibration suppressing unit disposed on a path along which the object is transported, vibrations of the object
wherein transporting the supplied object comprises floating the object in a non-contact manner by generating ultrasonic vibrations from an ultrasonic vibrator, the ultrasonic vibrator being disposed to face the object, and applying repelling force induced from the ultrasonic vibrations to the object, wherein the non-contact vibration suppressing unit comprises a first ultrasonic vibrator and a second ultrasonic vibrator, the first and second ultrasonic vibrators being spaced apart from and facing each other such that the object is to be transported therebetween, wherein the first and second ultrasonic vibrators hold the object therebetween in a non-contact manner by generating ultrasonic vibrations and applying repelling force induced from the ultrasonic vibrations to the object, thereby suppressing vibrations of the object, wherein the non-contact vibration suppressing unit holds the object in a non-contact manner right before and/or right after cutting the object, and wherein the first ultrasonic vibrator has a hole or a slit, and cutting the transported object comprises irradiating the object with a laser beam through the hole or the slit.

2. The method according to claim 1, wherein transporting the supplied object further comprises transporting the supplied object using a contact transportation unit in contact with at least one part of the object.

3. The method according to claim 2, wherein
the object comprises an effective area and an ineffective area around the effective area, and
the ultrasonic vibrator floats the object by applying the repelling force to the effective area, and the contact transportation unit comes into contact with the ineffective area.

4. The method according to claim 2, wherein the contact transportation unit comprises at least one selected from the group consisting of a conveyor belt, a roller and a moving clamp, each of which is to come into contact with the object.

5. The method according to claim 1, wherein transporting the object is performed by a transportation unit, wherein the transportation unit comprises:
a web transportation unit transporting a web of the object before the sheet cutting operation; and
a sheet transportation unit transporting a sheet of the object separated from the web of the object by the sheet cutting operation,
wherein a transportation speed of the sheet is greater than a transportation speed of the web right after the sheet cutting operation.

6. The method according to claim 1, wherein cutting the transported object comprises cutting the object in a non-contact manner.

7. The method according to claim 6, wherein cutting the transported object comprises cutting the object in a non-contact manner using a laser.

8. The method according to claim 1, wherein cutting the transported object comprises a trim cutting operation of trimming away an edge portion of the object along a length of the object.

9. The method according to claim 8, further comprising suppressing vibrations of a portion trimmed away from the object using a non-contact vibration suppressing unit disposed on a path along which the trimmed portion is discharged.

10. The method according to claim 9, wherein the non-contact vibration suppressing unit comprises a first ultrasonic vibrator and a second ultrasonic vibrator, the first and second ultrasonic vibrators being spaced apart from and facing each other such that the trimmed portion is to pass therebetween, wherein the first and second ultrasonic vibrators hold the trimmed portion therebetween in a non-contact manner by generating ultrasonic vibrations and applying repelling force induced from the ultrasonic vibrations to the trimmed portion, thereby suppressing vibrations of the trimmed portion.

11. The method according to claim 1, wherein the object comprises a thin object.

12. The method according to claim 11, wherein the object comprises thin glass.

13. The method according to claim 1, further comprising adjusting a tension of the object by applying force to the object using a dancer disposed on a path along which the object is transported, the dancer comprising an ultrasonic vibrator, wherein the ultrasonic vibrator applies the force to the object in a non-contact manner by generating ultrasonic vibrations and applying repelling force induced from the ultrasonic vibrations to the object.

* * * * *